US012571649B2

(12) United States Patent
Karagiannis et al.

(10) Patent No.: US 12,571,649 B2
(45) Date of Patent: Mar. 10, 2026

(54) UPDATING A MAP FOR USE IN LOCALISING A MOBILE DEVICE

(71) Applicant: Telefonaktiebolaget LM Ericsson (publ), Stockholm (SE)

(72) Inventors: Ioannis Karagiannis, Kalamata (GR); José Araújo, Stockholm (SE); Bryan Donyanavard, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 298 days.

(21) Appl. No.: 18/273,361

(22) PCT Filed: Jan. 25, 2021

(86) PCT No.: PCT/EP2021/051620
§ 371 (c)(1),
(2) Date: Jul. 20, 2023

(87) PCT Pub. No.: WO2022/156912
PCT Pub. Date: Jul. 28, 2022

(65) Prior Publication Data
US 2024/0310186 A1    Sep. 19, 2024

(51) Int. Cl.
*G06K 9/00*      (2022.01)
*G01C 21/00*      (2006.01)
(52) U.S. Cl.
CPC ................................. *G01C 21/3848* (2020.08)
(58) Field of Classification Search
CPC ........................ G01C 21/3848; G01C 21/3804
See application file for complete search history.

(56) References Cited

U.S. PATENT DOCUMENTS

2020/0077124 A1*  3/2020  Shi ...................... H04N 21/6587
2020/0364901 A1*  11/2020  Choudhuri .............. G06F 3/005
2020/0380719 A1  12/2020  Iyer et al.

FOREIGN PATENT DOCUMENTS

EP            3748299 A1    12/2020
JP        2020522944 A  *  7/2020  ........... H04N 23/698

OTHER PUBLICATIONS

International Search Report and Written Opinion of the International Searching Authority, PCT/EP2021/051620, mailed Oct. 26, 2021, 17 pages.
(Continued)

*Primary Examiner* — Xin Jia
(74) *Attorney, Agent, or Firm* — Sage Patent Group

(57)            ABSTRACT

It is provided a system for updating a map. The system includes: a server and a mobile device. The mobile device is configured to: obtain a metric set; determine that processing by the server is to be used for at least some map processing when the metric set indicates a network condition that is sufficiently good; instructing the server to perform at least some map processing, when processing by the server is determined to be used; perform all map processing within the mobile device, when processing by the server is determined not to be used; and update a local map in the mobile device based on a result from the map processing. The server is configured to: when instructed by the mobile device performing at least some map processing; and transmit at least part of the result of the map processing in the server, to the mobile device.

21 Claims, 4 Drawing Sheets

(56)     References Cited

OTHER PUBLICATIONS

Estrada, Carlos et al., "Hierarchical SLAM: real-time accurate mapping of large environments," IEEE Transactions on Robotics, Aug. 2005, vol. 21, No. 4, 7 pages.
Kim, Been et al., "Multiple relative pose graphs for robust cooperative mapping," 2010 IEEE International Conference on Robotics and Automation, Anchorage, Alaska, USA, 2010, 8 pages.
Github, Edge-SLAM: Edge-Assiged Visual Simultaneous Localization and Mapping, downloaded from the Internet on Jul. 6, 2023 from: https://github.com/droneslab/edgeslam, 7 pages.

* cited by examiner

UPDATING A MAP FOR USE IN LOCALISING A MOBILE DEVICE

CROSS REFERENCE TO RELATED APPLICATIONS

This application is a 35 U.S.C. § 371 national stage application of PCT International Application No. PCT/EP2021/051620 filed on Jan. 25, 2021, the disclosure and content of which is incorporated by reference herein in its entirety.

TECHNICAL FIELD

The present disclosure relates to the field of updating a map for use in localising a mobile device.

BACKGROUND

Localisation and mapping are used for many types of mobile devices, such as for extended reality (XR) devices, encompassing augmented reality (AR) and virtual reality (VR) devices, as well as self-driving cars, unmanned aerial vehicles, robots, etc. . . . Localisation is the process of determining the pose of a device/object in space, where pose is defined as the combination of position and orientation. Mapping is the process of mapping the real world in a data structure.

Performance of localisation and mapping for mobile devices can be enhanced by merging structural (visual and/or depth-related) information from electronic environment sensors e.g. cameras, lidar, etc., and motion information from Inertial Measurement Units (IMUs). In this way, the mobile device is able to acquire six degrees of freedom movements of the mobile device (rotation and translation).

The localisation is based on a map comprising representations of the physical space. The representation can be the result of processing of the raw structural data from one or more mobile devices, each comprising one or more environment sensors. The representation can e.g. comprise segments representing sections of the physical space and/or features representing distinguishable geometric structures in the physical space. The localisation is performed when captured data from the environment sensor(s) is processed and compared with the data in the map. When a match is found, this results in a pose of the mobile device being determined. When it is correctly determined that the mobile device has returned to a previously visited location, this is known as loop closure.

When both localisation and mapping is combined, i.e. learning an area while keeping track of a pose of a mobile device, this is known as Localisation and Mapping (LM), or Simultaneous Localisation and Mapping (SLAM).

Examples of the application of LM are Google ARKit, Apple ARCore and the Microsoft Hololens AR HMD. These frameworks use computer vision to give mobile devices the ability to determine their pose relative to the world around them.

One component in LM is the construction and repetitive update of the map. A relevant challenge arises from the fact that mobile devices can often be resource-constrained embedded devices, which reduces the extent of processing that can be performed for the localisation and/or the map processing.

A software framework called Edge-SLAM, is available at https://github.com/droneslab/edgeslam at the time of filing this application. Edge-SLAM is an edge-assisted visual simultaneous localisation and mapping. Edge-SLAM enables offloading of computation-intensive modules to the edge.

SUMMARY

One object is to adapt map processing to improve performance of map processing when conditions change.

According to a first aspect, it is provided a system for updating a map for use in localising the mobile device. The system comprises: a server and a mobile device. The mobile device comprises: a processor; and a memory storing instructions that, when executed by the processor, cause the mobile device to: obtain a metric set, comprising at least one network-related metric; determine, based on the metric set, that processing by the server is to be used for at least some map processing when the metric set indicates a network condition that is sufficiently good in terms of performance to satisfy a threshold condition; communicate with the server, instructing the server to perform at least some map processing, when processing by the server is determined to be used; perform all map processing within the mobile device, when processing by the server is determined not to be used; and update a local map in the mobile device based on a result from the map processing. The server comprises: a processor; and a memory storing instructions that, when executed by the processor, cause the mobile device to: when instructed by the mobile device performing at least some map processing; and transmit at least part of the result of the map processing in the server, to the mobile device.

According to a second aspect, it is provided a method for updating a map for use in localising a mobile device, the method being performed in the mobile device. The method comprises the steps of: obtaining a metric set, comprising at least one network-related metric; determining, based on the metric set, that processing by a server is to be used for at least some map processing when the metric set indicates a network condition that is sufficiently good in terms of performance to satisfy a threshold condition; communicating with the server, instructing the server to perform at least some map processing, when processing by the server is determined to be used; performing all map processing within the mobile device, when processing by the server is determined not to be used; and updating a local map in the mobile device based on a result from the map processing.

The at least one network-related metric may comprise a bandwidth metric.

The threshold condition may comprise that the bandwidth metric must satisfy a bandwidth threshold condition for at least some of the map processing to be performed by a server.

The at least one network-related metric may comprises a latency metric.

The threshold condition may comprise that the latency metric must satisfy a latency threshold condition for at least some of the map processing to be performed by a server.

The latency condition threshold may be evaluated based on a size of the local map, the bandwidth metric and a maximum allowable delay for map processing.

The latency threshold condition may be expressed as:

$$l < t/2 - M/B,$$

where l denotes the latency threshold, t denotes the maximum allowable delay, M denotes the size of the local map, and B denotes bandwidth.

The step of communicating with the server may comprise transmitting input data for the map processing.

The input data may comprise at least one data type selected from the group consisting of: images captured by the mobile device, measurements from an inertial measurement unit of the mobile device, key frames being key images captured by the mobile device, and a local map of the mobile device.

The method may further comprise the step, prior to the step of communicating, of: when processing by the server is determined not to be used, finding an alternative server to use, whose metric set indicates a network condition that satisfies the threshold condition. In this case, the alternative server is used in the step of communicating.

According to a third aspect, it is provided a mobile device for updating a map for use in localising the mobile device. The mobile device comprises: a processor; and a memory storing instructions that, when executed by the processor, cause the mobile device to: obtain a metric set, comprising at least one network-related metric; determine, based on the metric set, that processing by a server is to be used for at least some map processing when the metric set indicates a network condition that is sufficiently good in terms of performance to satisfy a threshold condition; communicate with the server, instructing the server to perform at least some map processing, when processing by the server is determined to be used; perform all map processing within the mobile device, when processing by the server is determined not to be used; and update a local map in the mobile device based on a result from the map processing.

The at least one network-related metric may comprise a bandwidth metric.

The threshold condition may comprise that the bandwidth metric must satisfy a bandwidth threshold condition for at least some of the map processing to be performed by a server.

The at least one network-related metric may comprise a latency metric.

The threshold condition may comprise that the latency metric must satisfy a latency threshold condition for at least some of the map processing to be performed by a server.

The latency condition threshold may be evaluated based on a size of the local map, the bandwidth metric and a maximum allowable delay for map processing.

The latency threshold condition may be expressed as:

$$l < t/2 - M/B,$$

where l denotes the latency threshold, t denotes the maximum allowable delay, M denotes the size of the local map, and B denotes bandwidth.

The instructions to communicate with the server may comprise instructions that, when executed by the processor, cause the mobile device to transmit input data for the map processing.

The input data may comprise at least one data type selected from the group consisting of: images captured by the mobile device, measurements from an inertial measurement unit of the mobile device, key frames being key images captured by the mobile device, and a local map of the mobile device.

The mobile device may further comprise instructions that, when executed by the processor, cause the mobile device, prior to the instructions of communicate, to: when processing by the server is determined not to be used, find an alternative server to use, whose metric set indicates a network condition that satisfies the threshold condition. In this case the alternative server is used in the instructions to communicate.

According to a fourth aspect, it is provided a computer program for updating a map for use in localising a mobile device. The computer program comprises computer program code which, when executed on a mobile device causes the mobile device to: obtain a metric set, comprising at least one network-related metric; determine, based on the metric set, that processing by a server is to be used for at least some map processing when the metric set indicates a network condition that is sufficiently good in terms of performance to satisfy a threshold condition; communicate with the server, instructing the server to perform at least some map processing, when processing by the server is determined to be used; perform all map processing within the mobile device, when processing by the server is determined not to be used; and update a local map in the mobile device based on a result from the map processing.

According to a fifth aspect, it is provided a computer program product comprising a computer program according to the fourth aspect and a computer readable means on which the computer program is stored.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

Aspects and embodiments are now described, by way of example, with reference to the accompanying drawings, in which.

DETAILED DESCRIPTION

The aspects of the present disclosure will now be described more fully hereinafter with reference to the accompanying drawings, in which certain embodiments of the invention are shown. These aspects may, however, be embodied in many different forms and should not be construed as limiting; rather, these embodiments are provided by way of example so that this disclosure will be thorough and complete, and to fully convey the scope of all aspects of invention to those skilled in the art. Like numbers refer to like elements throughout the description.

According to embodiments presented herein, map processing for a mobile device is performed by the best node, topologically, based on current network conditions. For instance, when network conditions are good, all or some map processing is performed by a server in communication with the mobile device in a cooperative mode. On the other hand, when network conditions are poor, the map processing is performed entirely by the mobile device in a standalone mode. This allocates a pipeline for LM processing in an elegant fashion, depending on the current properties of the network (e.g. in terms of latency and bandwidth). A memory-constrained mobile device can only sustain a local map of limited size and thus a short history of previously visited locations. This means that the localisation capabilities are limited. In the distributed scenario one or more servers are exploited to host computationally expensive operations as well as large global maps.

There are time-critical applications for which an up-to-date local map on the mobile device needs to be available on time for the accomplishment of a task. Using embodiments presented herein, under normal circumstances and when network conditions allow it, the mobile device operates in distributed localisation and mapping mode, i.e. exploiting the server. This overcomes the difficulty of a resource-constrained mobile device sustaining large-scale maps. It also allows for greater localisation accuracy, since the distributed LM pipeline can achieve more loop closures on a more accurate global map sitting in a server, and then update the local map of the mobile device accordingly. When network conditions deteriorate past a threshold condition, the mobile device falls back to the standalone mode. While, in this mode, localisation and mapping might not be optimal in terms of mapping ability, the mapping can proceed without greater reliability than relying the server in poor network conditions.

Figure 1:
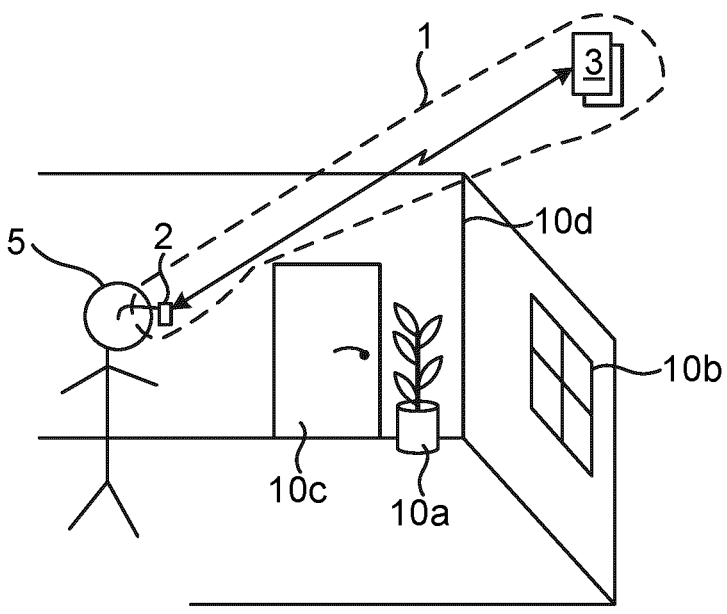
FIG. 1 is a schematic diagram illustrating an environment in which embodiments presented herein can be applied.

FIG. 1 is a schematic diagram illustrating an environment in which embodiments presented herein can be applied. In the example illustrated in FIG. 1, there is a user 5 with a mobile device 2. The mobile device 2 comprises at least one environment sensor. The mobile device 2 can be a wearable device, such as smart glasses, head-mounted display (HMD), or the mobile device 2 can be a smartphone, car, etc. The mobile device 2 can also be provided without a user, e.g. in the form of a self-driving vehicle or robot.

One or more servers 3 is provided with ability to communicate with the mobile device 2, as well as other mobile devices (not shown). The communication can e.g. be based on any one or more wireless or wired-based technology, such as a cellular network, any of the IEEE 802.11x standards (also known as WiFi), using Bluetooth or Bluetooth Low Energy (BLE), ZigBee, Ethernet, optical communication, etc. The cellular communication network can e.g. comply with any one or a combination of sixth generation (6G) networks, next generation mobile networks (fifth generation, 5G), LTE (Long Term Evolution), UMTS (Universal Mobile Telecommunications System) utilising W-CDMA (Wideband Code Division Multiplex), CDMA2000 (Code Division Multiple Access 2000), or any other current or future wireless network, as long as the principles described hereinafter are applicable.

The server 3 can be implemented as a so-called edge server, implying that it is topologically close to the mobile device 2, which reduces latency and increases responsiveness. Alternatively, the server 3 is implemented in a more central location topologically, which allows the server 3 to serve a larger number of mobile devices 2 in different areas.

Collectively, the server 3 and one or more mobile devices 2 can form a system 1, that is used for updating a map for use in localising the mobile device 2, according to procedures that are described in more detail below.

In the environment around the user, there are a number of visual features 10a-d, e.g. a first visual feature 10a in the form of a plant, a second visual feature 10b, in the form of a window, a third visual feature 10c in the form of a door and a fourth visual feature 10d in the form of a corner in the room. There may be many more (or fewer) visual features depending on the location of the user 5 and feature detection capabilities of the mobile device 2.

The mobile device 2 is capable of performing localisation as well as mapping using its environment sensor, e.g. based on SLAM. By performing localisation and mapping, the mobile device is able to calculate its pose with respect to the physical space. Pose is a term that includes both position and direction.

The mobile device 2 stores a local map. When all map processing is performed in the mobile device 2, the map processing results in updates to the local map.

The server 3 stores a global map, also sometimes referred to as a central map. It is to be noted that the global map is global only within the particular implementation. In other words, for multiple implementations or systems, there are respective global maps. Since the server 3 is less restricted in terms of processing power and storage, the global map can be significantly larger than the local map. For instance, the local map can be a subset of the global map, covering an area or a set of features covered by the global map. Hence, the global map on the server is richer than the local map, unless the mobile device is in an area not covered by the global map, in which case the local map and the global map can, at least initially, develop synchronously.

In other words, the local map is a map which can contain information related to the immediate vicinity of the mobile device. A global map is a map which is an aggregation of a plurality local maps. Hence, a global map comprises information related to an environment which is typically acquired over a longer period of time and can also contain local maps acquired by more than one device and for multiple different physical locations.

According to embodiments presented herein, there are the two operating modes of a standalone mode and a cooperative mode. The mobile device alternates between the two operating modes depending on the network conditions.

In the standalone mode, the processing in each of the mobile device 2 and the server 3 runs as a monolith, with no communication with the other. The history horizon available for the mobile device to detect loop closures is limited due to the limited map storage for the local map. The server can host a global map of the entire terrain of interest. This global map sitting on the server may have been updated for a long time by one or multiple mobile devices. This means that the global map contains accumulated knowledge of the terrain from multiple mobile devices. Hence, one disadvantage while in the standalone mode is that a single mobile device does not have access to this accumulated knowledge, whereby its pose estimate based on the local map is inferior to pose estimates based on the global map. Hence, not only the localisation of the mobile device will be of reduced accuracy, but given the limited memory of the mobile device, it will be more difficult to perform loop closures.

In the cooperative mode, after the connection is established between the mobile device and the server, and given that the network conditions are sufficiently good, frontend processing runs on the mobile device and backend processing runs on the server. The line separating the frontend from the backend can vary, e.g. depending on what SLAM pipeline is applied or architectural considerations. But in the delineation between frontend and backend, activities such as feature detection and object detection are advantageously executed close to the environment sensor, in what is called frontend processing. More complicated tasks such as the mapping can be executed in the backend. The split of tasks between the mobile device 2 and the server 3 can vary depending on the LM algorithm and/or configuration. In this mode, the mobile device provides data (e.g. as a data stream) to the server, the server updates its global map and transmits the result back to the mobile device that updates its local map. The mobile device performs localisation based on the most recently updated local map. The size of the local map can be adapted depending on the available memory on the mobile device. The server can be configured to provide updates to the local map that are relevant to the current position of the mobile device and its direction of motion, while respecting the available memory of the mobile device.

Figure 2:
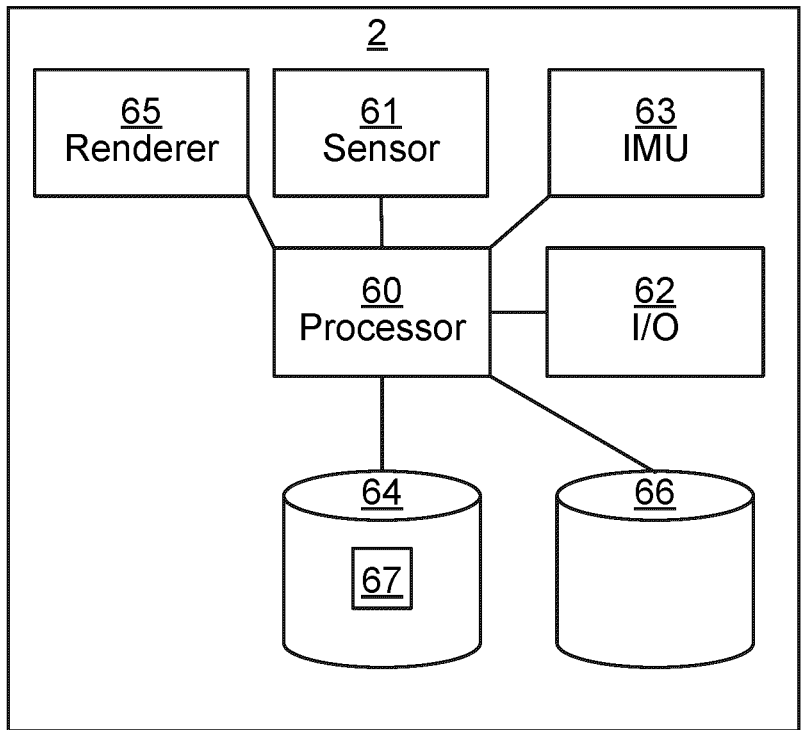
FIG. 2 is a schematic diagram illustrating components of the mobile device of FIG. 1 according to one embodiment.

FIG. 2 is a schematic diagram illustrating components of the mobile device 2 of FIG. 1 according to one embodiment. A processor 60 is provided using any combination of one or more of a suitable central processing unit (CPU), graphics processing unit (GPU), multiprocessor, microcontroller, digital signal processor (DSP), etc., capable of executing software instructions 67 stored in a memory 64, which can thus be a computer program product. The processor 60 could alternatively be implemented using an application specific integrated circuit (ASIC), field programmable gate array (FPGA), etc. The processor 60 can be configured to execute the mobile device steps of the methods described with reference to FIGS. 4A and 4B below.

The memory 64 can be any combination of random-access memory (RAM) and/or read-only memory (ROM). The memory 64 also comprises persistent storage, which, for example, can be any single one or combination of magnetic memory, optical memory, solid-state memory or even remotely mounted memory.

A data memory 66 is also provided for reading and/or storing data during execution of software instructions in the processor 60. The data memory 66 can be any combination of RAM and/or ROM.

An optional renderer 65 is provided for rendering visual data to the user 5, e.g. in the form of a head-mounted display, a touch screen or a traditional display. An environment sensor 61 is capable of capturing still and/or moving images of the environment around the user 5, in two dimensions (2D) and/or in three dimensions (3D). The environment sensor 61 can e.g. be based on capturing visual light, IR light and/or is based on lidar or radar technology. An inertial measurement unit (IMU) is provided to determine linear acceleration and/or angular velocity (via the gyroscope) of the mobile device 2.

The mobile device 2 further comprises an I/O interface 62 for communicating with external and/or internal entities, such as with the server 3 and a wide area network such as the Internet.

Other components of the mobile device 2 are omitted in order not to obscure the concepts presented herein.

Figure 3:
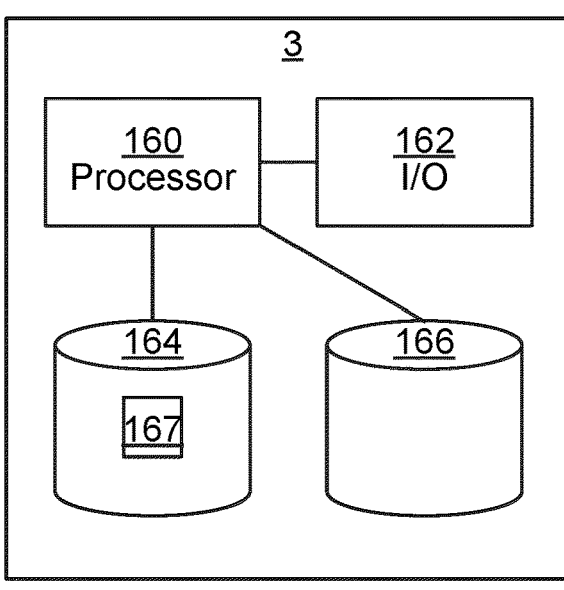
FIG. 3 is a schematic diagram illustrating components of the server of FIG. 1 according to one embodiment.

FIG. 3 is a schematic diagram illustrating components of the server 3 of FIG. 1 according to one embodiment. A processor 160 is provided using any combination of one or more of a suitable central processing unit (CPU), graphics processing unit (GPU), multiprocessor, microcontroller, processing unit (GPU), multiprocessor, microcontroller, digital signal processor (DSP), etc., capable of executing software instructions 167 stored in a memory 164, which can thus be a computer program product. The processor 160 could alternatively be implemented using an application specific integrated circuit (ASIC), field programmable gate array (FPGA), etc. The processor 160 can be configured to execute the server steps of the methods described with reference to FIGS. 4A and 4B below.

The memory 164 can be any combination of random-access memory (RAM) and/or read-only memory (ROM). The memory 164 also comprises persistent storage, which, for example, can be any single one or combination of magnetic memory, optical memory, solid-state memory or even remotely mounted memory.

A data memory 166 is also provided for reading and/or storing data during execution of software instructions in the processor 160. The data memory 166 can be any combination of RAM and/or ROM.

The server 3 further comprises an I/O interface 162 for communicating with external and/or internal entities, such as with the mobile device 2 and a wide area network such as the Internet.

Other components of the server 3 are omitted in order not to obscure the concepts presented herein.

Figure 4A:
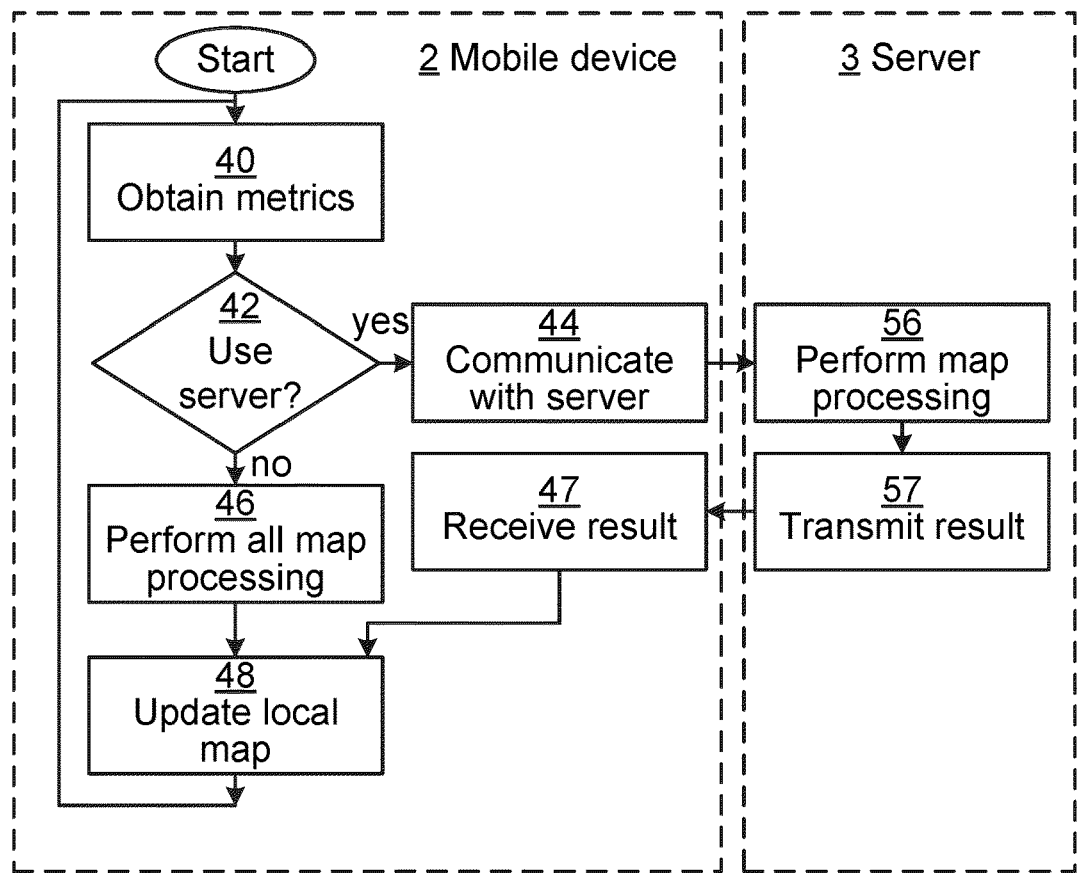
FIGS. 4A-B are flow charts illustrating embodiments of methods for updating a map for use in localising a mobile device.
Figure 4B:
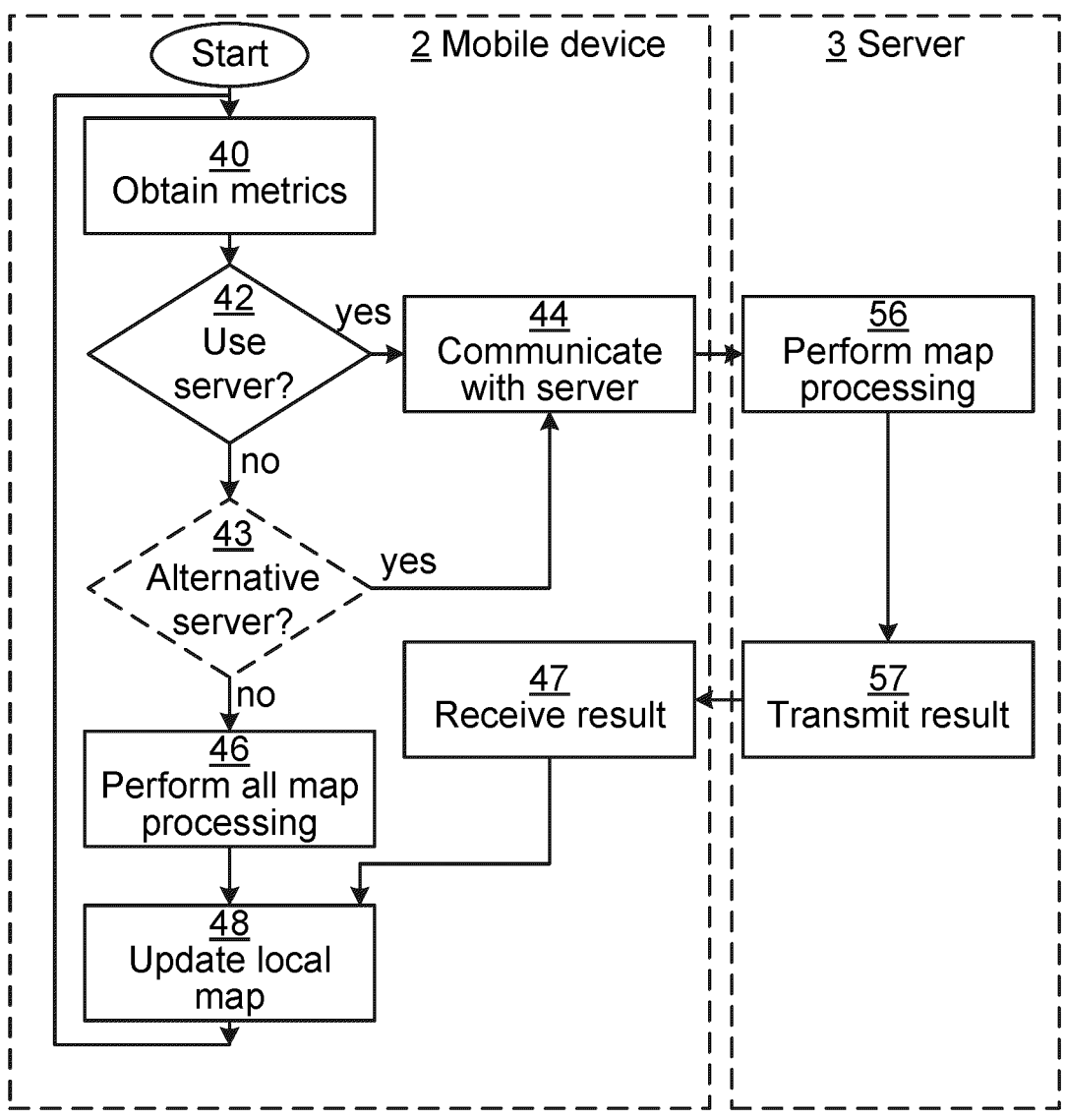

FIGS. 4A-B are flow charts illustrating embodiments of methods for updating a map for use in localising a mobile device 2. First, embodiments illustrated by FIG. 4A will be described.

In an obtain metrics step 40, the mobile device 2 obtains a metric set, comprising at least one network-related metric.

The at least one network-related metric can comprise a bandwidth metric and/or a latency metric. The bandwidth metric can indicate available communication capacity between the mobile device 2 and the server 3 (in either or both directions), expressed as data per unit of time, e.g. Mbit/s. The latency can indicate latency, expressed as a measurement due to communication (transfer time and optionally also communication processing times on either or both ends) between the mobile device 2 and the server (in either or both directions) expressed in terms of time, e.g. milliseconds or microseconds. Optionally, the latency metric is obtained by averaging a number of latency measurements in order to reduce fluctuations, e.g. in a sliding window fashion or in discrete time periods.

In a conditional use server step 42, the mobile device 2 determines when, based on the metric set (from step 40), processing by a server 3 is to be used for at least some map processing. This determination is affirmative when the metric set indicates a network condition that is sufficiently good in terms of performance to satisfy a threshold condition.

Optionally, the threshold condition comprises that the bandwidth metric must satisfy a bandwidth threshold condition for at least some of the map processing to be performed by a server. For instance, the threshold condition can be based on that the bandwidth metric must exceed a certain threshold bandwidth.

Optionally, the threshold condition comprises that the latency metric must satisfy a latency threshold condition for at least some of the map processing to be performed by a server. For instance, the threshold condition can be based on that the latency must be less than a certain latency threshold. Optionally, the latency condition threshold is evaluated based on a size of the local map, the bandwidth metric and a maximum allowable delay for map processing. For instance, the latency threshold condition can be expressed as:

$$l < \frac{t}{2} - \frac{M}{B}, \qquad (1)$$

where l denotes the latency threshold, t denotes the maximum allowable delay, M denotes the size of the local map, and B denotes bandwidth.

When the threshold condition is based on both the bandwidth metric and the latency metric, the threshold condition can e.g. contain a condition for throughput, where throughput is the amount of data that is being transferred over a specified amount of time.

When the determination is positive, the mobile device assumes the cooperative mode and the method proceeds to a communicate with server step 44. Otherwise, the mobile device assumes the standalone mode and the method proceeds to a perform all map processing step 46.

In the communicate with server step 44, the mobile device 2 communicates with the server 3, instructing the server 3 to perform at least some map processing. This communication can comprise transmitting, to the server 3, input data for the map processing. The input data can comprise at least one data type selected from the group consisting of: images captured by the mobile device 2, measurements from an IMU 63 of the mobile device 2, key frames being key images captured by the mobile device 2, and a local map of the mobile device 2. The type of input data can vary depending on a split of tasks for map processing between the mobile device and the server. Moreover, available memory in the mobile device for local maps can be provided to the server.

In a perform map processing step 56, once the server 3 has received the instructions to perform map processing, the server performs the at least some map processing of the instructions provided in step 44.

The local map for the mobile device can be determined in this step. The local map for the mobile device can be based on the current position and optionally also the direction of motion of the mobile device. Furthermore, the local map can be determined such that it complies with available memory of the mobile device. The map can be compressed by the server prior to transmission to the mobile device. This compression is performed to reduce memory usage in the memory-constrained mobile device. The server optionally has the ability to adapt the compression algorithm in a way that it fits the requirements of localisation of the mobile device based on its current position and direction of motion, as well as the available memory in the mobile device.

In a multiple server scenario, there are some additional aspects to consider. The server in communication with the mobile device may or may not have the global map required for the application that the mobile device is running. In case the server has an out-of-date global map, or in case it does not have the required global map at all, the server can request an global map update from neighbouring servers, and these servers will propagate this request to their neighbour servers, which may continue recursively until the server has retrieved a complete updated global map.

In another multiple server scenario, the server initially in communication with the mobile device, here denoted the first server, is busy executing other tasks of higher priority. To resolve this situation, the first server arranges for the instructed mapping to be performed by a second server (as long as an overall latency requirement will be satisfied, if not the mobile device should switch to the standalone mode).

Once the second server has performed the instructed mapping, the results (e.g. an updated global map) are provided to the first server.

In a transmit result step 57, the server transmits at least part of the result of the map processing in the server, to the mobile device 2. The result can be a replacement local map to be used by the mobile device or an update to the local map of the mobile device.

The state of the global map is updated by the map processing in step 56. The result transmitted to the mobile device contains information of the current state of the global map. Hence, the server transmits at least part of the current state of the global map.

For example, if the current state of the global map contains 10,000 vertices, the results that are transmitted to the mobile device can contain a subset of the current state of the global map, e.g. 500 vertices that are the most relevant for the mobile device, e.g. based on location, direction of motion and speed of the mobile device.

The total size of the local map should not exceed a predefined threshold. This threshold should allow the mobile device to expand its local map for as long as it needs to run in standalone mode due to network failure, or in case more applications than the LM pipeline need to run in parallel.

When some map processing is performed by the server 3, the processing can e.g. be split such that the mobile device outputs pose estimates that can be used to build visual-inertial maps, and the server performs all major mapping processing tasks, such as map optimisation, map summarisation, map compression etc.

In a receive result step 47, the mobile device 2 receives the result of the map processing that is transmitted from the server 3 in step 57.

In a perform all map processing step 46, (which is reached when the result of the conditional use server step 42 is negative), the mobile device 2 performs all map processing within the mobile device 2, as defined by the stand-alone mode.

In an update local map step 48, the mobile device 2 updates the local map in the mobile device 2 based on a result from the map processing. After this step, the method repeats. In cooperative mode, every time the mobile device receives the result in the form of an update for its local map or a complete replacement local map, it either updates the existing local map or substitutes it with the replacement one.

Looking now to FIG. 4B, only new or changed steps will be described in a scenario where there are multiple servers. In this embodiment, when there is a negative result from step 42, the method proceeds to an optional conditional alternative server step 43.

In the optional conditional alternative server step 43, the mobile device 2 determines whether the mobile device can find an alternative server to use, whose metric set indicates a network condition that satisfies the threshold condition. This is based on that, in the obtain metrics step 40, a plurality of metric sets for communication between the mobile device 2 and respective servers is obtained.

If the determination in step 43 is affirmative, the method proceeds to the communicate with server step 44, in which the alternative server is used, either in direct communication between the mobile device and the alternative server, or indirectly, via another server, e.g. a server that the mobile device first communicates with. If the determination is negative, the method proceeds to the perform all map processing step 46.

In one embodiment, when a server $e_j$ receives the message from mobile device $d_k$ with respect to the required resources, if server $e_j$ does not have the required resources or the global map, server $e_j$ communicates with the rest of the servers to allocate the required resources elsewhere and/or retrieve an up-to-date global map. Once all the required resources and the global map are available, server $e_j$ sends back to mobile device $d_k$ a confirmation message and the map processing occurs with the difference that some of the map processing are outsourced from server $e_j$ to other servers. If the connection between the mobile device and the server is interrupted, the mobile device will thus try to connect to the server having the second-best network conditions with the mobile device, etc.

In one embodiment, the mobile device $d_k$ loses connectivity with server $e_j$, and it takes a while before it manages to connect to another server $e_p$, whereby the mobile device assumes the stand-alone mode. The longer the mobile device $d_k$ stays in the standalone mode, the less accurate the pose estimates will be during this time. This is due to the fact that the mobile device is a memory-constrained mobile device and can therefore host a local map of smaller size than the global map. With a short history it becomes more difficult to perform loop closures. If the loss of connectivity is transient then this is not a big issue, but if the loss lasts longer, then optimal performance cannot be expected during that time. For example, in the case where the mobile device is a mixed reality headset, assuming standalone mode can result in some increased errors in the position where virtual content is rendered. However, compared to the prior art, where no switch to standalone mode occurs, the standalone provides significantly improved performance in map processing since the limited map processing in standalone mode is significantly better than no map processing at all.

In one embodiment, the mobile device $d_k$ stays connected to the server $e_j$ that has satisfied the threshold condition in the best way. If the network conditions with the server $e_j$ deteriorates, but it is still better than a minimum threshold, the mobile device optionally performs a handover to another server $e_p$. For instance, an increase in latency could be considered as an indication that the connection will drop, indicating that the mobile device should be proactive and perform the handover. In this way, the risk of falling back to standalone mode decreases, or at least the time the mobile device needs to operate in standalone mode is reduced. In order to perform the handover, the new server $e_p$ should have an up-to-date global map, which can be obtained from server $e_j$. The server $e_p$ can thus communicate with the server $e_j$ to obtain the global map, in order for the transition to be as smooth as possible. Once the global map is downloaded on the server $e_p$, the handover can occur.

In one embodiment, the mobile device requests an update for its local map from the server with which the latency is less than a predefined threshold, but in this case, the mobile device specifies a deadline. There are time-critical applications (e.g. collaborative mobile robots, cloud-rendered XR games, remote control with haptic feedback, etc.) for which the time difference between arrival and request of the local map update must be below some threshold. There are two cases to consider that are mentioned here:

In a first case, the network conditions satisfy the threshold condition and the server $e_j$ hosts the global map. If we denote the maximum allowable delay deadline with t, the one-way latency with l, the size of the local map with M, and the bandwidth with B then the following criterion shall be met:

$$2\left(l + \frac{M}{B}\right) < t \tag{2}$$

This can be re-written as a latency threshold condition:

$$l < \frac{t}{2} - \frac{M}{B} \tag{1}$$

from above

For instance, assume that the required deadline for an application is 100 ms, which means that the mobile device expects to receive updates for its local map every 100 ms. Let us assume also that the network latency is 20 ms (one way), the size of the transmitted map is 1 MB and the network bandwidth is 200 Mbps. Then we will have that, using the expression on the rights side of equation (1) and considering that one byte equals eight bits:

$$\frac{t}{2} - \frac{M}{B} = \frac{100\ ms}{2} - \frac{1\ MB}{200\ Mbps} = 50\ ms - 40\ ms = 10\ ms$$

This result of the expression, 10 ms, is not greater than l, which is 20 ms. In other words, the latency threshold condition is not satisfied in this example.

In a second case, the threshold condition is met, but the server $e_j$ does not host the global map. In this case, the server $e_j$ can estimate how long it would take to perform all the steps to deliver to the mobile device an update for its local map or a new local map. Depending on the availability of resources on server $e_j$, the update of the global map could take place on server $e_j$ or on some remote server $e_p$ from which server $e_j$ will retrieve the global map. Therefore, whether the deadline will be met or not depends on the network bandwidth, the mobile device-to-server latency and the server-to-server latency. The mobile device should eventually connect with the server that most likely ensures that the estimated arrival-time of the global map minus the request-time of the global map is below a predefined threshold that satisfies the deadline requirements set by the LM application running on mobile device.

When switching between the standalone mode to the cooperative mode occurs, the switching can occur in two directions.

When the switch occurs from the standalone mode to the cooperative mode, the mobile device can send a message to the server with requirements in terms of resources for the map processing. Once the server can indicate that the required resources are available, it sends a confirmation back to the mobile device. The mobile device deactivates the standalone mode part associated with the heavy map operations such as map-summarisation, map-optimisation, map-compression, etc. The mobile device sends its current local map to the server, the server performs the aforementioned map-operations and it sends back to the mobile device an update for the local map. As described in a previous embodiment, the resource allocation may occur based on multiple servers.

When the switch occurs from the cooperative mode to the standalone mode, the mobile device activates the backend part of the LM framework, in order to continue generating consistent local maps for as long as the interruption with the server lasts. The accuracy of the estimated pose during this time is expected to be compromised.

Figure 5:
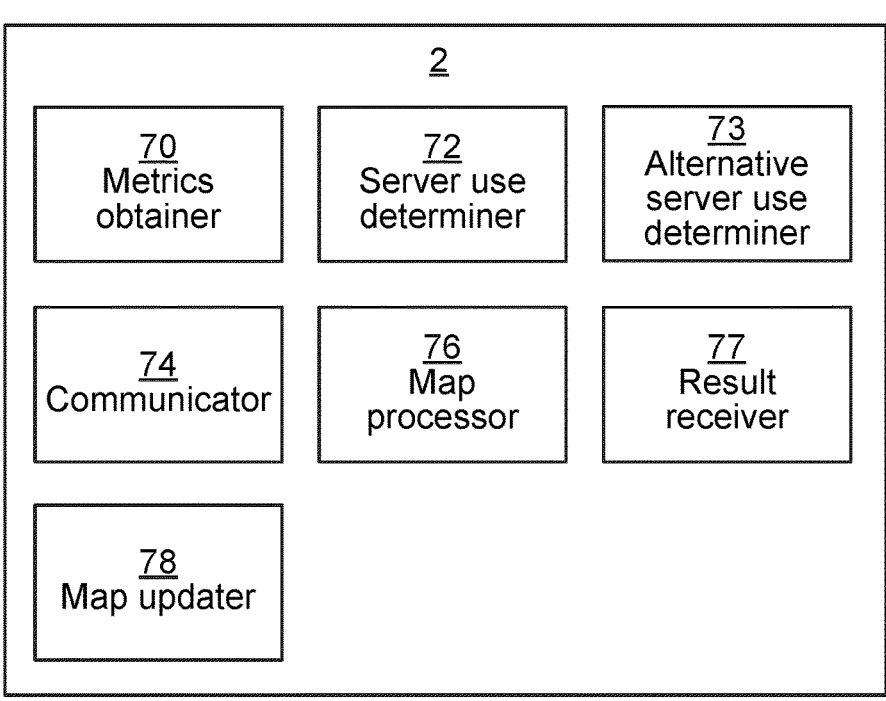
FIG. 5 is a schematic diagram showing functional modules of the mobile device of FIG. 1 according to one embodiment.

FIG. 5 is a schematic diagram showing functional modules of the mobile device 2 of FIG. 1 according to one embodiment. The modules are implemented using software instructions such as a computer program executing in the mobile device 2. Alternatively or additionally, the modules are implemented using hardware, such as any one or more of an ASIC (Application Specific Integrated Circuit), an FPGA (Field Programmable Gate Array), or discrete logical circuits. The modules correspond to the steps of the mobile device 2 in the methods illustrated in FIGS. 4A and 4B.

A metrics obtainer 70 corresponds to step 40. A server use determiner 72 corresponds to step 42. An alternative server use determiner 73 corresponds to step 43. A communicator 74 corresponds to step 44. A map processor 76 corresponds to step 46. A result receiver 77 corresponds to step 47. A map updater 78 corresponds to step 48.

Figure 6:
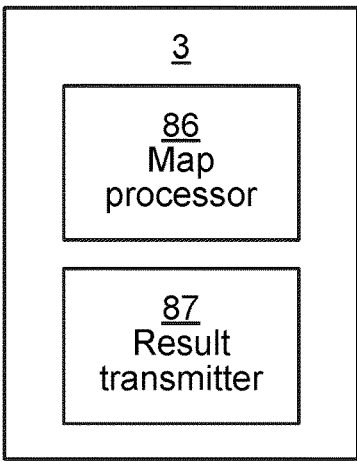
FIG. 6 is a schematic diagram showing functional modules of the server of FIG. 1 according to one embodiment.

FIG. 6 is a schematic diagram showing functional modules of the server 3 of FIG. 1 according to one embodiment. The modules are implemented using software instructions such as a computer program executing in the server 3. Alternatively or additionally, the modules are implemented using hardware, such as any one or more of an ASIC (Application Specific Integrated Circuit), an FPGA (Field Programmable Gate Array), or discrete logical circuits. The modules correspond to the steps of the server 3 in the methods illustrated in FIGS. 4A and 4B.

A map processor 86 corresponds to step 56. A result transmitter 87 corresponds to step 57.

Figure 7:
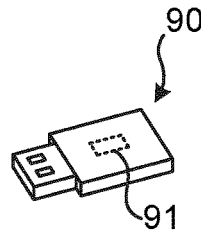
FIG. 7 shows one example of a computer program product comprising computer readable means.

FIG. 7 shows one example of a computer program product comprising computer readable means. On this computer readable means, a computer program 91 can be stored, which computer program can cause a processor to execute a method according to embodiments described herein, for either one or both of the mobile device 2 and the server 3. In this example, the computer program product is in the form of a removable solid-state memory, e.g. a Universal Serial Bus (USB) drive. As explained above, the computer program product could also be embodied in a memory of a device, such as the computer program product 64 of FIG. 2 or the computer program product 164 of FIG. 3. While the computer program 91 is here schematically shown as a section of the removable solid-state memory, the computer program can be stored in any way which is suitable for the computer program product, such as another type of removable solid-state memory, or an optical disc, such as a CD (compact disc), a DVD (digital versatile disc) or a Blu-Ray disc.

The aspects of the present disclosure have mainly been described above with reference to a few embodiments. However, as is readily appreciated by a person skilled in the art, other embodiments than the ones disclosed above are equally possible within the scope of the invention, as defined by the appended patent claims. Thus, while various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A system for updating a map for use in localising the mobile device, the system comprising:
a server; and
the mobile device, comprising:
a processor; and
a memory storing instructions that, when executed by the processor, cause the mobile device to:
obtain a metric set, comprising at least one network-related metric;

determine, based on the metric set, that processing by the server is to be used for at least some map processing when the metric set indicates a network condition that is sufficiently good in terms of performance to satisfy a threshold condition;
communicate with the server, instructing the server to perform at least some map processing, when processing by the server is determined to be used;
perform all map processing within the mobile device, when processing by the server is determined not to be used; and
update a local map in the mobile device based on a result from the map processing;
wherein the server comprises:
a processor; and
a memory storing instructions that, when executed by the processor, cause the mobile device to:
when instructed by the mobile device, perform at least some map processing; and
transmit at least part of the result of the map processing in the server, to the mobile device.

2. A method for updating a map for use in localising a mobile device, the method being performed in the mobile device, the method comprising:
obtaining a metric set, comprising at least one network-related metric;
determining, based on the metric set, that processing by a server is to be used for at least some map processing when the metric set indicates a network condition that is sufficiently good in terms of performance to satisfy a threshold condition;
communicating with the server, instructing the server to perform at least some map processing, when processing by the server is determined to be used;
performing all map processing within the mobile device, when processing by the server is determined not to be used; and
updating a local map in the mobile device based on a result from the map processing.

3. The method according to claim 2, wherein the at least one network-related metric comprises a bandwidth metric.

4. The method according to claim 3, wherein the threshold condition comprises that the bandwidth metric must satisfy a bandwidth threshold condition for at least some of the map processing to be performed by a server.

5. The method according to claim 2, wherein the at least one network-related metric comprises a latency metric.

6. The method according to claim 5, wherein the threshold condition comprises that the latency metric must satisfy a latency threshold condition for at least some of the map processing to be performed by a server.

7. The method according to claim 6, wherein the at least one network-related metric comprises a bandwidth metric, and wherein the latency condition threshold is evaluated based on a size of the local map, the bandwidth metric and a maximum allowable delay for map processing.

8. The method according to claim 7, wherein the latency threshold condition is expressed as:

$$l < \frac{t}{2} - \frac{M}{B},$$

where I denotes the latency threshold, t denotes the maximum allowable delay, M denotes the size of the local map, and B denotes bandwidth.

9. The method according to claim 2, wherein the step of communicating with the server comprises transmitting input data for the map processing.

10. The method according to claim 9, wherein the input data comprises at least one data type selected from the group consisting of: images captured by the mobile device, measurements from an inertial measurement unit of the mobile device, key frames being key images captured by the mobile device, and a local map of the mobile device.

11. The method according to claim 2, further comprising the step, prior to the step of communicating, of:

when processing by the server is determined not to be used, finding an alternative server to use, whose metric set indicates a network condition that satisfies the threshold condition;

wherein the alternative server is used in the step of communicating.

12. A mobile device for updating a map for use in localising the mobile device, the mobile device comprising:

a processor; and a memory storing instructions that, when executed by the processor, cause the mobile device to:

obtain a metric set, comprising at least one network-related metric;

determine, based on the metric set, that processing by a server is to be used for at least some map processing when the metric set indicates a network condition that is sufficiently good in terms of performance to satisfy a threshold condition;

communicate with the server, instructing the server to perform at least some map processing, when processing by the server is determined to be used;

perform all map processing within the mobile device, when processing by the server is determined not to be used; and update a local map in the mobile device based on a result from the map processing.

13. The mobile device according to claim 12, wherein the at least one network-related metric comprises a bandwidth metric.

14. The mobile device according to claim 13, wherein the threshold condition comprises that the bandwidth metric must satisfy a bandwidth threshold condition for at least some of the map processing to be performed by a server.

15. The mobile device according to claim 12, wherein the at least one network-related metric comprises a latency metric.

16. The mobile device according to claim 15, wherein the threshold condition comprises that the latency metric must satisfy a latency threshold condition for at least some of the map processing to be performed by a server.

17. The mobile device according to claim 16 when dependent on claim 13, wherein the latency condition threshold is evaluated based on a size of the local map, the bandwidth metric and a maximum allowable delay for map processing.

18. The mobile device according to claim 17, wherein the latency threshold condition is expressed as:

$$l < \frac{t}{2} - \frac{M}{B},$$

where I denotes the latency threshold, t denotes the maximum allowable delay, M denotes the size of the local map, and B denotes bandwidth.

19. The mobile device according to claim 12, wherein the instructions to communicate with the server comprise instructions that, when executed by the processor, cause the mobile device to transmit input data for the map processing.

20. The mobile device according to claim 19, wherein the input data comprises at least one data type selected from the group consisting of: images captured by the mobile device, measurements from an inertial measurement unit of the mobile device, key frames being key images captured by the mobile device, and a local map of the mobile device.

21. The mobile device according to claim 12, further comprising instructions that, when executed by the processor, cause the mobile device, prior to the instructions of communicate, to:

when processing by the server is determined not to be used, find an alternative server to use, whose metric set indicates a network condition that satisfies the threshold condition;

wherein the alternative server is used in the instructions to communicate.

\* \* \* \* \*